(12) United States Patent
Watanabe et al.

(10) Patent No.: US 6,928,337 B2
(45) Date of Patent: Aug. 9, 2005

(54) ROBOT SIMULATION APPARATUS

(75) Inventors: Atsushi Watanabe, Tokyo (JP);
Tetsuya Kosaka, Minamitsura-gun (JP);
Yoshiharu Nagatsuka, Minamitsuru-gun (JP)

(73) Assignee: Fanuc Ltd., Oshino-Mura (JP)

(*) Notice: Subject to any disclaimer, the term of this patent is extended or adjusted under 35 U.S.C. 154(b) by 115 days.

(21) Appl. No.: 10/269,992

(22) Filed: Oct. 15, 2002

(65) Prior Publication Data
US 2003/0074170 A1 Apr. 17, 2003

(30) Foreign Application Priority Data
Oct. 16, 2001 (JP) ........................................ 2001-317842

(51) Int. Cl.$^7$ .............................................. G06F 19/00
(52) U.S. Cl. ...................... 700/245; 700/256; 700/264; 700/83; 700/85; 700/17; 700/80; 700/87; 361/680; 361/683; 703/6
(58) Field of Search ................................ 700/245, 256, 700/264, 83, 86, 17, 18, 80, 79, 87; 361/680, 683, 71–75; 703/6

(56) References Cited

U.S. PATENT DOCUMENTS

| | | | |
|---|---|---|---|
| 6,161,051 A | * | 12/2000 | Hafemann et al. ............ 700/86 |
| 6,356,806 B1 | * | 3/2002 | Grob et al. ................. 700/245 |
| 2002/0120921 A1 | * | 8/2002 | Coburn et al. ............... 717/140 |
| 2003/0182083 A1 | * | 9/2003 | Schwenke et al. ............ 702/183 |
| 2004/0073404 A1 | * | 4/2004 | Brooks et al. ............... 702/183 |

FOREIGN PATENT DOCUMENTS

| | | |
|---|---|---|
| EP | 001304194 A2 * | 9/2002 |
| JP | 05-324022 | 12/1993 |
| JP | 07-064618 | 3/1995 |
| JP | 10-249671 | 9/1998 |
| JP | 10-260713 | 9/1998 |
| JP | 2001-105137 | 4/2001 |
| JP | 2001-252884 | 9/2001 |

OTHER PUBLICATIONS

FANUC, Multi–purpose intellignet robot, 97–, Internet, pp. 1–3.*
FANUC, Multi–purpose intellignet robot series, 97–, Internet, pp. 1–2.*
Dai et al., Pin a PC–based robot simulation and offline programming system using macro programming techniques, 1999, IEEE, pp. 442–446.*
FANUC, A new robot teach pendant with internet interface, 97–, Internet, pp. 1–2.*
FANUC, Robotics, 1997, Internet, pp. 1–2.*
FANUC, A new age of industry customer training schedule, 200, Internet, 1–23.*
Ohtsuka et al., Depth perception from motion parallax in teh peripheral vision, 1994, IEEE, pp. 72–77.*
Notice of Reasons for Rejection for corresponding Japanese U.S. Application No. 201–317842 mailed Apr. 13, 2004.

* cited by examiner

*Primary Examiner*—Thomas G. Black
*Assistant Examiner*—Marc McDieunel
(74) *Attorney, Agent, or Firm*—Staas & Halsey LLP

(57) ABSTRACT

A computer is connected to a system formed by combining a robot with a peripheral device (such as a welder). The computer receives robot mechanical unit motion position information supplied from a robot controller and command information to be outputted to the peripheral device, and displays motions of the robot mechanical unit and the peripheral device on its display screen in an animation form.

14 Claims, 5 Drawing Sheets

ROBOT SIMULATION APPARATUS

BACKGROUND OF THE INVENTION

1. Field of the Invention

The present invention relates to an apparatus for simulating a motion of a robot mechanical unit taught to a robot controller. In particular, the present invention relates to a robot simulation apparatus for simulating a motion of a system formed by combining a robot and its peripheral device.

2. Description of the Prior Art

There is already known a robot simulation apparatus that displays a motion of a robot mechanical unit on a screen of a display apparatus in an animation form on the basis of a teaching motion program taught to a robot controller, and simulates the robot mechanical unit motion in order to study and confirm the teaching motion program.

Furthermore, there has also been developed an apparatus in which a robot controller and a computer are connected to each other, and the computer receives a robot mechanical unit motion signal from the robot controller and displays a robot mechanical unit motion on its display screen in an animation form (see, for example, Japanese Patent Application Laid-Open Publication No. 2001-105359). In this technique, however, animation display of the robot mechanical unit motion based on the robot mechanical unit motion signal is conducted, but I/O data are not displayed.

When simulating the robot mechanical unit motion on the basis of a teaching motion program, it is difficult in this technique to conduct simulation of I/O (input/output) signals. Therefore, it is difficult to track and analyze alarms and errors caused in the controller. As a result, this technique is insufficient as simulation of the whole system, and it is not sufficient in evaluation of a teaching motion program.

OBJECTS AND SUMMARY OF THE INVENTION

An object of the present invention is to provide a robot simulation apparatus capable of conducting motion simulation on the whole system including a combination of a robot and a peripheral device.

In a robot simulation apparatus according to the present invention, an information processing apparatus such as a computer is connected to a system formed by combining an actual robot with an actual peripheral device to conduct simulation on motions of the system.

In a first aspect of such a robot simulation apparatus, an information processing apparatus is connected to a robot controller for controlling the robot mechanical unit, via a communication line. Robot mechanical unit motion position information supplied from the robot controller, and command information to be outputted to the peripheral device are sent to the information processing apparatus via the communication line. On the basis of the robot mechanical unit motion position information and command information, motions of the robot mechanical unit and the peripheral device are displayed on a screen of the information processing apparatus in an animation form.

In a second aspect of the robot simulation apparatus, an information processing apparatus is connected to a robot controller for controlling the robot mechanical unit, via a first communication line. In addition, the robot controller is connected to a peripheral device via a second communication line. The robot controller sends robot mechanical unit motion position information to the information processing apparatus together with state information indicating a control state of the peripheral device received from the peripheral device. On the basis of the robot mechanical unit motion position information and state information, a motion of the robot mechanical unit is displayed in an animation form. In addition, the control state of the peripheral device is displayed, or a motion of the peripheral device is displayed in an animation form.

When there are a plurality of robot controllers in the first or second aspect, robot identification information is provided every robot controller, and information sent from each robot controller to the information processing apparatus is provided with the robot identification information. Animation display is effected on the screen of the information processing apparatus on the basis of the robot identification information.

In a third aspect of the robot simulation apparatus, a first information processing apparatus for storing information concerning control of a robot or a peripheral device is connected to a second information processing apparatus via a communication line. The information concerning the robot or the peripheral device is sent from the first information processing apparatus to the second information processing apparatus via the communication line. And the information concerning control of the robot or the peripheral device is displayed on the screen of the second information processing apparatus.

According to the present invention, a motion according to a motion program executed by the robot controller is displayed on the screen in an animation form. In addition, a motion of the peripheral device is displayed on the same screen. Therefore, the analysis of the whole system is facilitated. In addition, when an alarm or an error occurs in the robot controller, it becomes easy to find the cause.

BRIEF DESCRIPTION OF THE DRAWINGS

The foregoing and other objects and features of the invention will become apparent from the following description of the preferred embodiments of the invention with reference to the accompanying drawings, in which.

DETAILED DESCRIPTION OF THE PREFERRED EMBODIMENTS

A first embodiment of the present invention will now be described with reference to FIGS. 1 and 5.

A robot controller 1 and a computer 4 serving as an information processing apparatus are connected with each other via an Ethernet (trade mark) cable 5. The robot controller 1 includes a processor, memories such as a ROM and a RAM, servo controllers for driving and controlling servo motors that drive respective axes of a robot mechanical unit 2, servo amplifiers, a teaching pendant, an input/output interface for connecting a peripheral device, and a communication interface. The computer 4 includes a processor, memories such as a ROM and a RAM, a graphic display device, a keyboard, a mouse, a scanner, and a communication interface.

Figure 1:
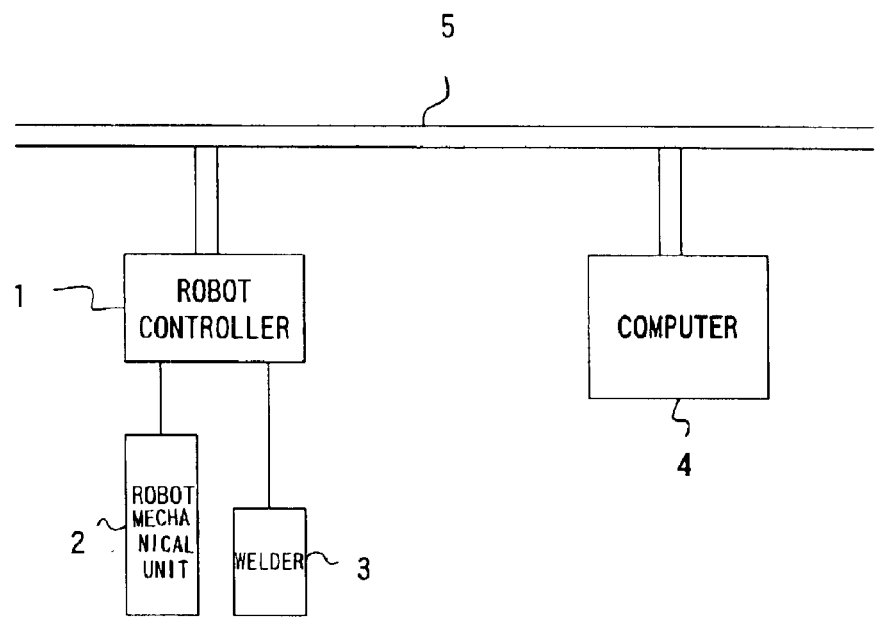
FIG. 1 is a schematic diagram of first and second embodiments of the present invention.

As shown in FIG. 1, a welder 3, as an example of a peripheral device, is connected to the robot controller 1. A welding torch is attached to a tip of a wrist of a robot arm of the robot mechanical unit 2.

A three-dimensional model of the robot mechanical unit 2 and three-dimensional models of machines and tools used in the robot system, such as a peripheral device, a work end effector and a jig, are stored in the computer 4 beforehand. In the present embodiment, the welder 3 is used as a peripheral device. Therefore, three-dimensional models of the welder 3 and the torch and a three-dimensional model of a work for conducting welding are stored in a memory of the computer 4 beforehand.

Furthermore, it is supposed that a motion program is taught to the robot controller 1 via its teaching pendant and stored in a memory included in the robot controller 1. Furthermore, it is supposed that welding conditions such as a welding current, voltage and velocity are already set.

The motion program is started from the computer 4. A motion of the robot mechanical unit is displayed on a display screen of a graphic display apparatus of the computer 4 in an animation form. FIG. 5 shows a basic algorithm of a simulation motion using animation display of the robot mechanical unit motion in the first embodiment.

When a robot mechanical unit motion animation command is inputted from the computer 4, communication between the robot controller 1 and the computer 4 is first started and a time interval for acquiring data of the animation motion is set. It is desirable that this time interval is the same as that for control of the actual robot and the actual peripheral device. And execution of a motion program taught to the robot controller 1 is started (steps 101 to 103).

The robot controller 1 executes the motion program on the basis of the robot mechanical unit motion animation command issued by the computer 4 as heretofore described, and outputs a move command to the robot mechanical unit 2. However, a command to the welder 3 included in the motion program is not actually outputted to the welder 3, but outputted only to the computer 4.

At the time intervals set at the step 102, a current motion position of the robot mechanical unit is read out. On the basis of the motion position information thus read out, the position and attitude of the three-dimensional model of the robot mechanical unit and the three-dimensional model of the welder 3, which serves as a peripheral device, and its torch are determined, and displayed on the display screen of the graphic display apparatus. Furthermore, a locus of a position of a robot TCP (tool center point) at this time is also drawn (step 104). In addition, I/O information directed to the peripheral device is also read. Since in this embodiment the peripheral device is the welder 3, a welding start command, a welding end command, a current command, a voltage command and a velocity command are read out, and displayed on the display screen of the graphic display apparatus in the computer 4.

When the welding start command is read, the locus of the position of the robot TCP is changed in color to, for example, red and displayed. Furthermore, when the current command, the voltage command and the velocity command are read, these values are displayed on the display screen (steps 104 to 107).

And it is determined whether a program end command has been read (step 108). Until the end of the program, the processing of the steps 104 to 108 is repetitively executed at the time intervals set at the step 102.

As a result, the motion of the robot mechanical unit is displayed on the display screen of the graphic display apparatus of the computer 4 in an animation form on the basis of the motion program. In addition, the locus of the TCP is also displayed. Moreover, between issuance of the welding start command and issuance of the welding end command, the locus of the welding section is displayed with a color (for example, red) different from that used when welding is not conducted.

If the welding end command is issued, the locus is displayed with a different color (for example, white). I/O data, such as the welding current command, voltage command and velocity command, are displayed moment by moment at the same time. Therefore, it is possible to grasp the state of the whole system including the robot and the peripheral device by simulation involving the robot mechanical unit animation.

If the motion program thus finishes, then communication between the robot controller 1 and the computer 4 is finished (step 109).

A second embodiment of the present invention will now be described with reference to FIG. 6.

In the present embodiment, the robot controller 1 and the computer 4 (information processing apparatus) are connected to each other via the Ethernet (trade mark) cable 5, and the welder 3 (peripheral device) is connected to the robot controller 1, in the same way as the first embodiment (FIG. 1).

First, there is conducted setting as to whether history is stored (at step 201). Subsequent processing (processing of steps 202 to 208) is the same as that of the steps 101 to 107 of FIG. 5. In other words, the motion position information of the robot mechanical unit is read at set time intervals, and the commands issued to the welder are read. And the robot mechanical unit motion and the motion of the welder (peripheral device) are respectively displayed on the screen in an animation form. In addition, information representing the state of the welder is also displayed.

If the history storage is set (step 209), then the read motion position information of the robot mechanical unit and the I/O information (information such as, the current command, voltage command and velocity command, of the welder in this example) are stored (step 210). And if not determined that the program is to be finished (step 211), then the program returns to the step 205, the processing of the steps 205 to 211 is repetitively executed, and the motion of the robot mechanical unit and the motion of the peripheral device are displayed in an animation form to simulate the motion program.

If the motion program thus finishes, then communication between the robot controller 1 and the computer 4 is finished (step 212) and the simulation is stopped. The storage of the control history is conducted in order to verify the motion when a problem has occurred in the robot mechanical unit motion, when an alarm has occurred, or when it is desired to effect some improvement or modification on the robot mechanical unit motion. It is possible to display the stored motion history on the display screen of the graphic display apparatus of the computer 4 and verify the problem and modification.

In the first and second embodiments, the robot mechanical unit 2 is actually activated, but a command is not outputted to the welder 3 (peripheral device) and welding is not conducted. However, it is also possible to output the commands to the welder 3 as well, actually activate the robot mechanical unit 2 and the welder 3 as well, and monitor the motion of the welding robot mechanical unit in the actual motion state by displaying it on the display screen of the graphic display apparatus of the computer 4 in an animation form. In this case, in the first and second embodiments, the actual welding current value and voltage value fed back from the welder 3 to the robot controller 1, instead of the welding current command and the welding voltage command, are sent to the computer 4 and displayed on the display screen of the graphic display apparatus.

As a matter of course, it is also possible to send the move command and the welding command in the motion program to the computer 4 (not to the robot mechanical unit 2 and the welder 3) without actually activating the robot mechanical unit 2 or the welder 3 and display the animation of the robot mechanical unit motion and the welding motion state of the welder 3 on the display screen of the graphic display apparatus of the computer 4 in real time.

Although it has been described that the welding motion state of the welder 3 is displayed, actually only a change of an attitude of the torch (not illustrated) attached to the tip of the wrist of the robot mechanical unit is displayed on the screen. Because only the torch changes in attitude in the welder attached to the robot mechanical unit. On the other hand, if the peripheral device is an automatic tool exchanger, then its position and attitude change, and consequently changes of them are displayed on the screen in an animation form.

A third embodiment of the present invention will now be described with reference to FIG. 2.

Figure 2:
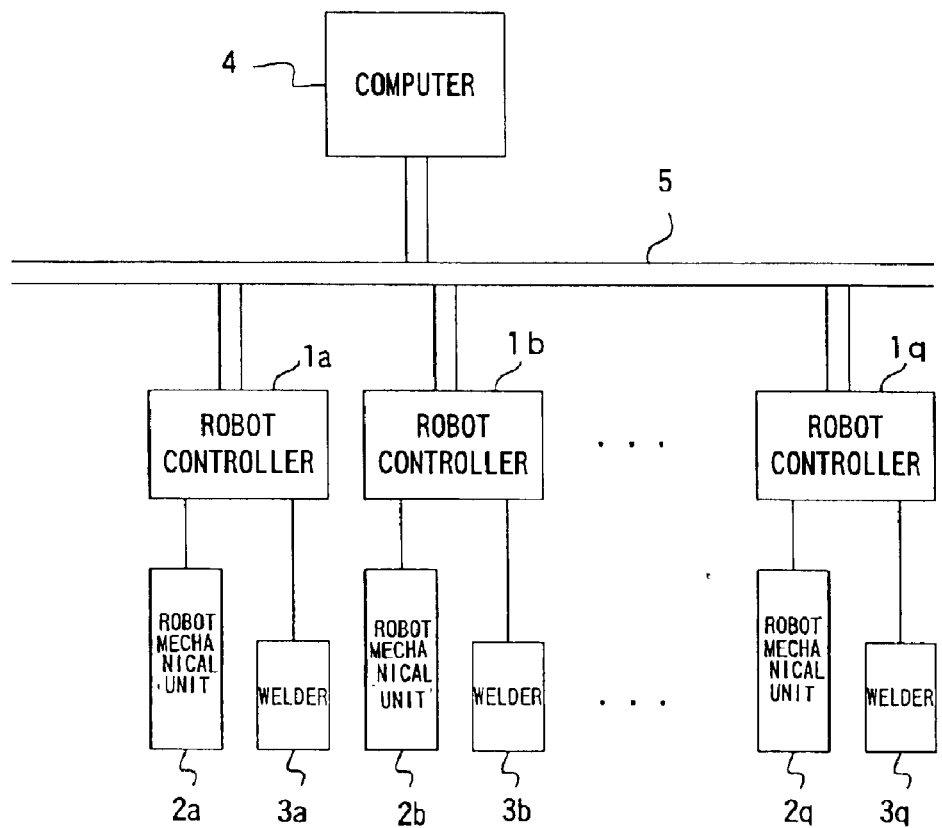
FIG. 2 is a schematic diagram of a third embodiment of the present invention.

As shown in FIG. 2, a plurality of robot controllers 1a to 1q and one computer 4 are connected to each other via an Ethernet (trade mark) cable 5. Robot mechanical units 2a to 2q and welders 3a to 3q (peripheral devices) are connected to the robot controllers 1a to 1q, respectively.

In the present embodiment, robot identification information is set in each of the robot controllers 1a to 1q. Three-dimensional models of the robot mechanical units 2a to 2q and three-dimensional models of the welders 3a to 3q are stored in a memory of the computer 4 every robot identification information. On a display screen of a graphic display apparatus of the computer 4, a display region is assigned to each robot identification information. Animations of the robot mechanical units 2a to 2q are drawn in the assigned regions, respectively. A motion program is stored in each of the robot controllers 1a to 1q.

Figure 5:
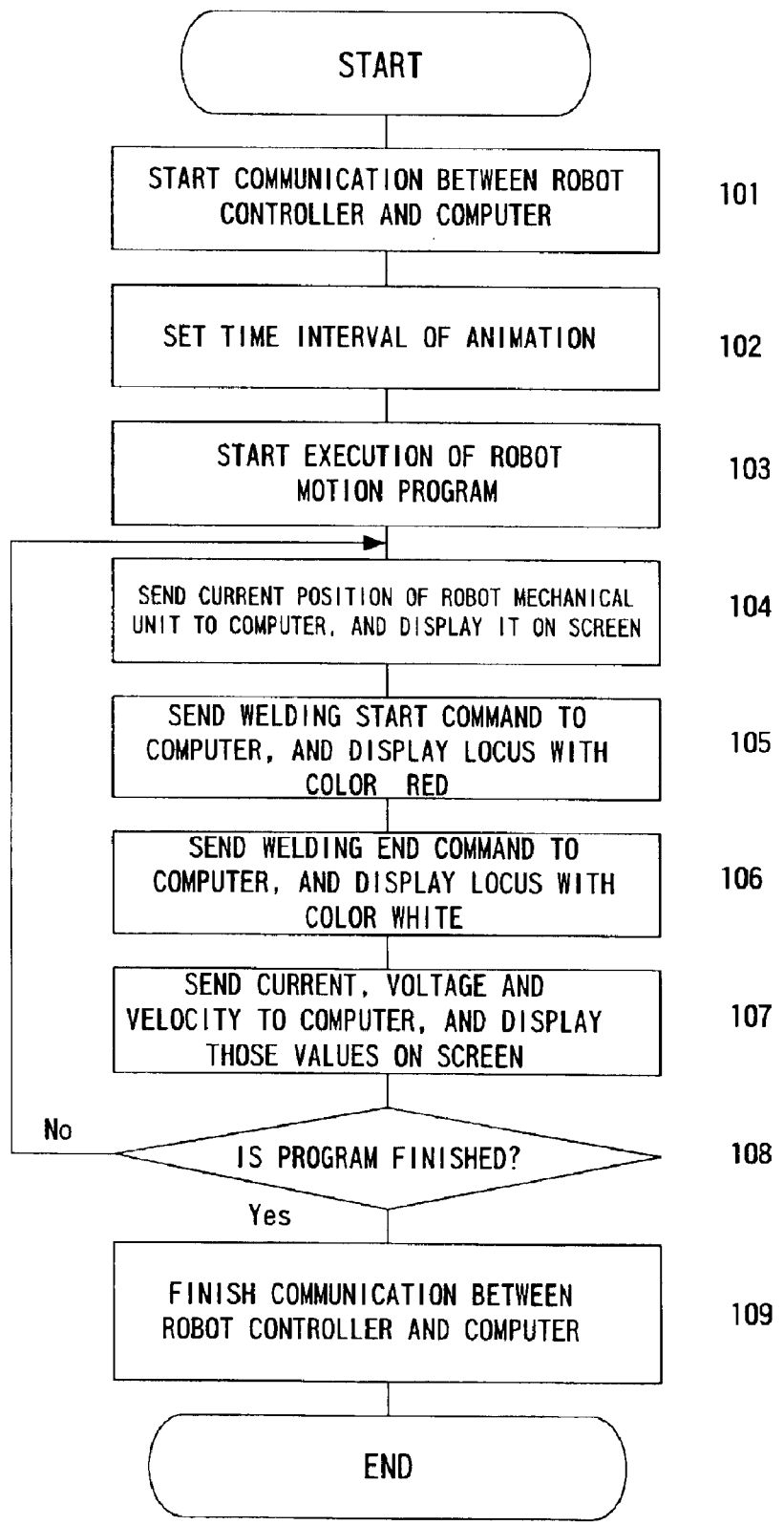
FIG. 5 is a flow chart showing an outline of animation display processing of a robot mechanical unit motion according to the first embodiment of the present invention.
Figure 6:
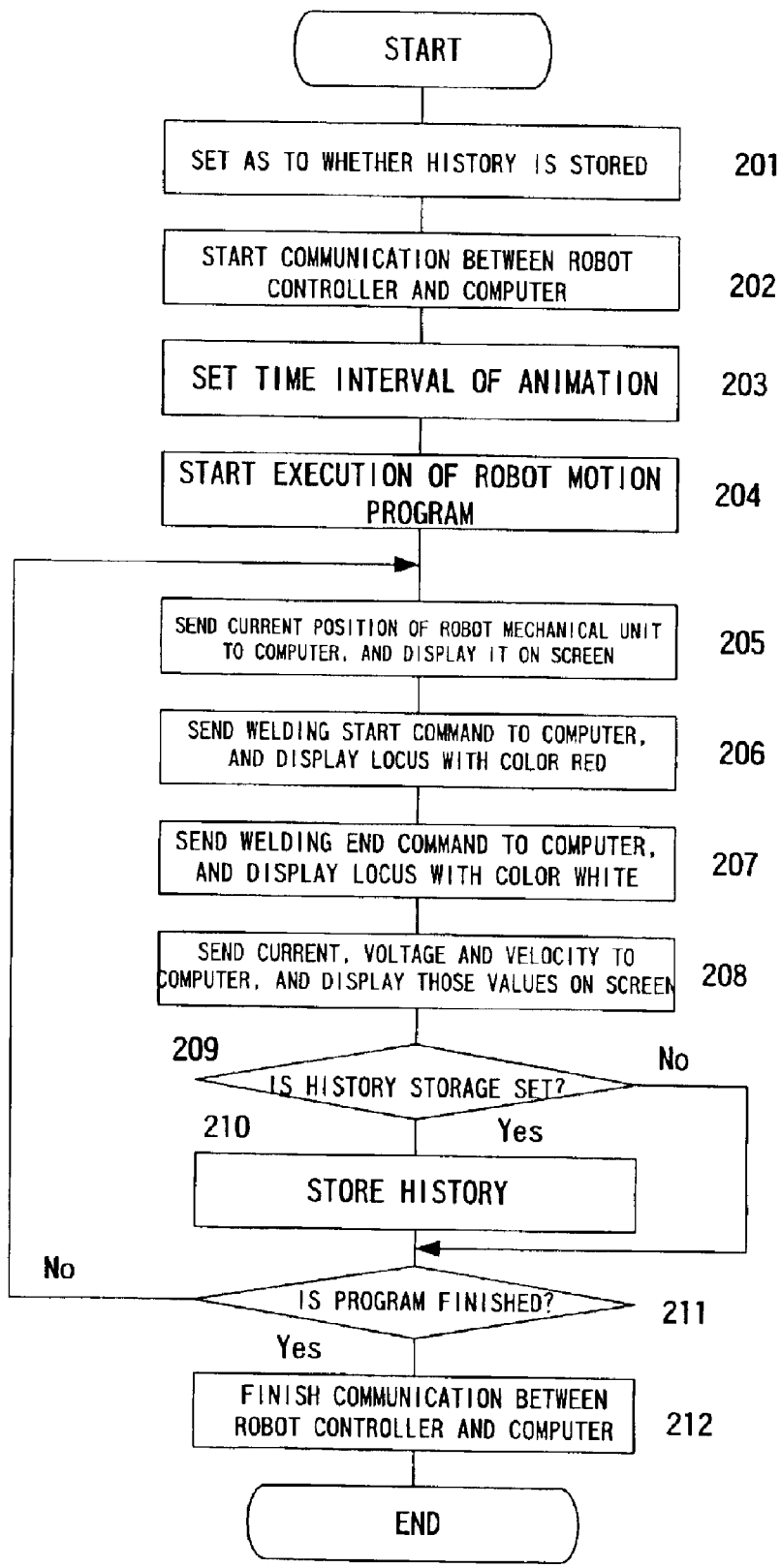
FIG. 6 is a flow chart showing an outline of animation display processing of a robot mechanical unit motion according to any of the second to fourth embodiments of the present invention.

When a robot controller is selected by robot identification information and a motion animation command of the corresponding robot mechanical unit is given from the computer 4, the selected robot controller executes the motion program stored in its memory by processing of algorithm shown in FIG. 5 or FIG. 6. The computer 4 selects three-dimensional models of the robot mechanical unit and welder (peripheral device) corresponding to the selected robot controller, and displays a motion according to the motion program on the display screen of the graphic display apparatus.

Furthermore, a locus of a TCP during the execution of welding and a locus of the TCP at the time when the welding is not being executed are displayed with colors changed. Furthermore, motion states of the welders 3a to 3q are displayed moment by moment. Each of the robot controllers 1a to 1q sends motion position information and state information of the welders 3a to 3q to the computer 4, together with its own robot identification information. The computer 4 determines which of the robot controllers has sent the information on the basis of the robot identification information, and displays motion of the corresponding robot mechanical unit in an animation form.

The computer 4 outputs a robot mechanical unit motion animation command to the plurality of robot controllers 1a to 1q, receives time-divided information such as motion position information together with the robot identification information from the plurality of robot controllers 1a to 1q, displays motions of the robot mechanical units in an animation form, and thus effects simulation. As a result, motions of a plurality of robot mechanical units are displayed on the display screen of the graphic display apparatus of the computer 4. Therefore, motion relations among the robot mechanical units can be verified on the display screen.

Furthermore, in the case where control history is stored, the history is stored together with the robot identification information at the step 210 in FIG. 6. Or the received information, such as motion position information, is stored together with the pertinent robot identification information in memory regions provided every robot identification information.

Figure 7:
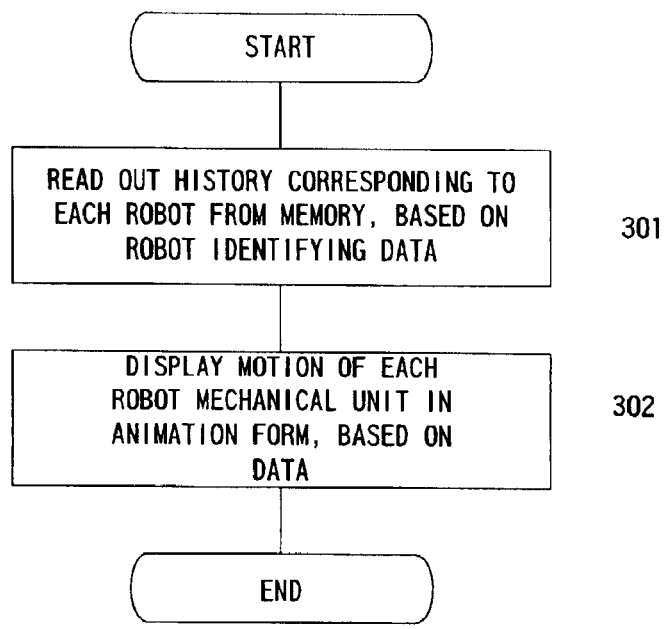
FIG. 7 is a flow chart showing computer processing conducted when robot mechanical unit animation is effected on the basis of history information stored together with robot identification information at step 210 of FIG. 6.

Thereafter, robot mechanical unit animation is executed on the basis of the stored history information. FIG. 7 is a flow chart showing processing conducted in the computer 4 when the robot mechanical unit animation is conducted on the basis of the history information.

First, robot identification information of one or more robots to be subject to an animation motion is inputted, and a history animation command is inputted to the computer 4. Thereupon, the computer 4 reads out history information corresponding to the input robot identification information at predetermined time intervals (step 301), displays motions of respective robot mechanical units on the display screen of the graphic display apparatus of the computer 4 in an animation form on the basis of the motion position information read out, and displays various kinds of information described above, such as the TCP locus and the motion state of the peripheral device (welder) (step 302).

Figure 3:
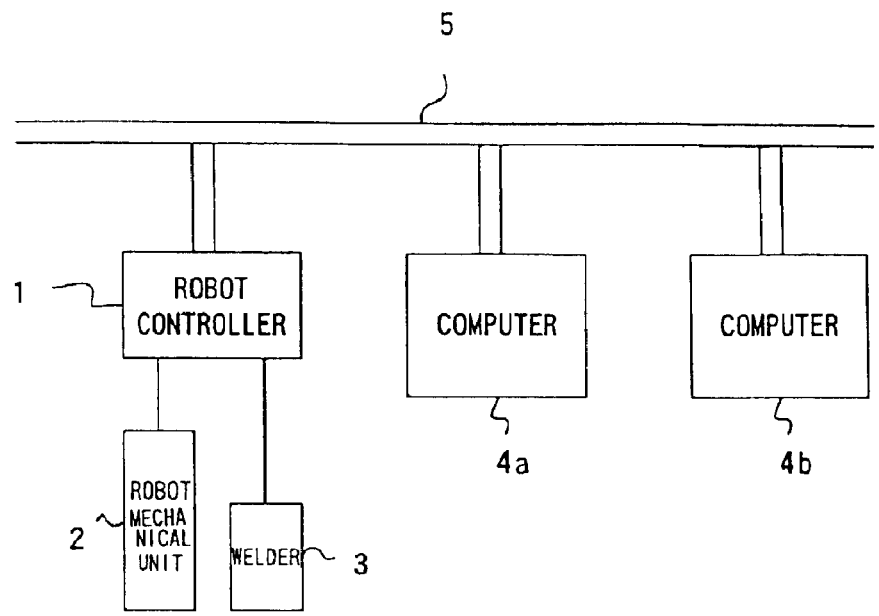
FIG. 3 is a schematic diagram of a fourth embodiment of the present invention.

A fourth embodiment of the present invention will now be described with reference to FIG. 3.

The present embodiment corresponds to the first embodiment with another computer connected to the Ethernet (trade mark) cable 5 added. In other words, the robot controller 1 and a first computer 4a and a second computer 4b are connected to the Ethernet cable 5.

The first computer 4a conducts the above described processing of FIG. 6, and stores control history of the robot controller. In addition, the first computer 4a conducts addition or a change of I/O information that does not directly relate to the robot motion program, on the stored control history information of the robot, and stores resultant information as information concerning the control of the robot or the peripheral device. And the information is displayed on the display screen of the graphic display apparatus of the second computer 4b.

In other words, addition or a change of the I/O information is conducted on the control history information stored by the first computer 4a. Resultant information is stored as information concerning the control of the robot or the peripheral device, and read out at the same time intervals as the robot and the peripheral device are controlled (i.e., time intervals at which the history information is stored). And information thus read out is transmitted to the second computer 4b. An animation display is effected on the display screen of the graphic display apparatus of the second computer 4b on the basis of the information. Even when the second computer 4b is disposed in a second position further away than a first position in which the first computer 4a is disposed, the robot mechanical unit motion can be managed in the second position.

Figure 4:
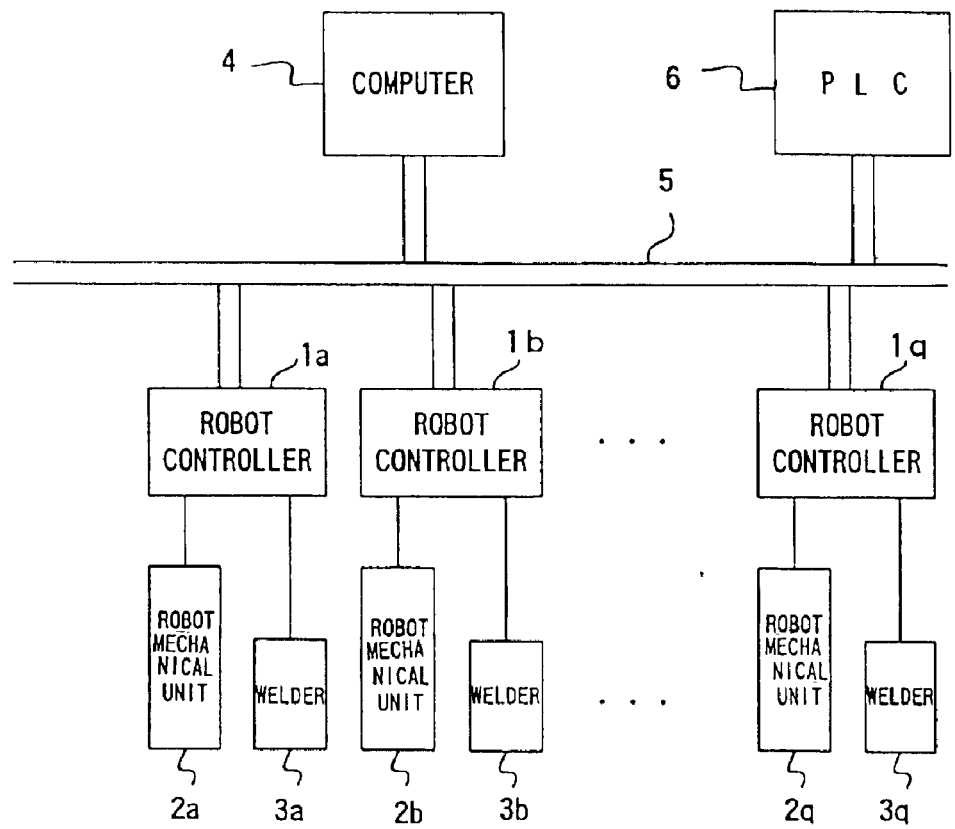
FIG. 4 is a schematic diagram of a fifth embodiment of the present invention.

A fifth embodiment of the present invention will now be described with reference to FIG. 4.

The present embodiment corresponds to the third embodiment shown in FIG. 2 with a programmable logic controller (hereafter referred to as PLC) 6 serving as another independent information processing apparatus connected to the Ethernet (trade mark) cable 5 added. In the PLC 6, a programmable control function is provided every robot identification information of the robot controllers 1a to 1q, and sequence programs of respective robot mechanical units are stored.

Figure 8:
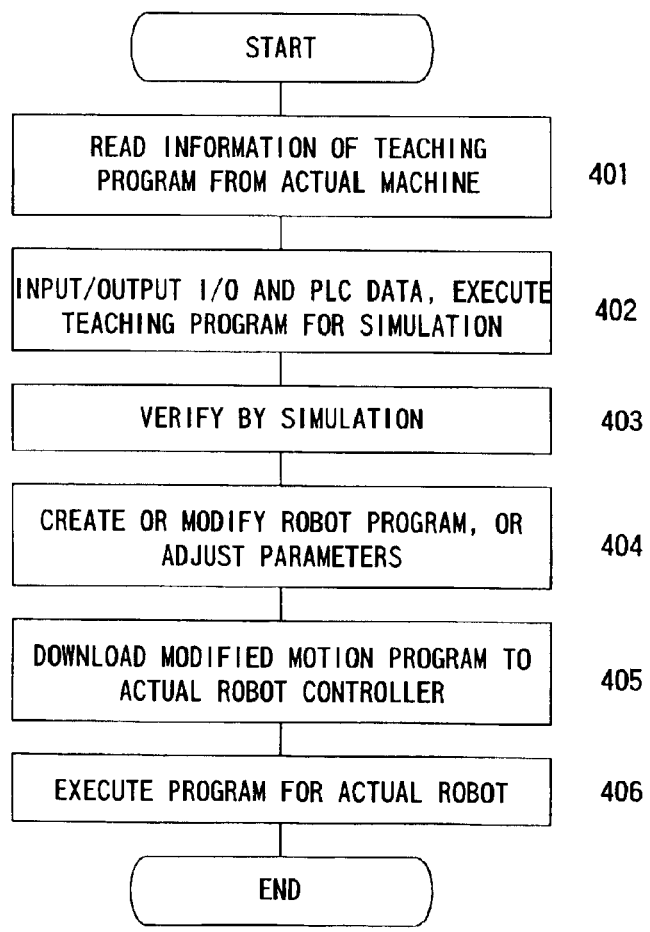
FIG. 8 is a flow chart showing an outline of animation display processing of a robot mechanical unit motion according to the fifth embodiment of the present invention.

Therefore, a robot controller is specified by the robot identification information, and a motion of the corresponding robot mechanical unit is displayed in an animation form. Thus, a change of the robot motion program and various parameters is facilitated. FIG. 8 is a flow chart showing this motion algorithm.

The computer 4 first specifies a robot controller by using robot identification information, reads a teaching motion program from the specified robot controller, and stores the teaching motion program in a memory of the computer 4 (step 401). Subsequently, the computer makes the robot controller specified by the robot identification information execute the motion program, makes the PLC 6 execute the sequence program corresponding to the robot identification information, takes I/O data in the computer 4 by processing similar to that shown in FIG. 6, and stores control history (step 402). And on the basis of the information fed from the robot controller and information fed from the PLC 6, the computer 4 displays the robot mechanical unit on the display screen of the graphic display apparatus of the computer 4 in an animation form, and displays motion state information of the peripheral device as well (step 402).

The computer 4 conducts verification by means of the animation (step 403). In addition, the computer 4 causes the animation to be executed according to the control history, conducts verification, conducts necessary modification, addition and deletion of I/O data, modifies various parameters, and obtains new information concerning the control of the robot or the peripheral device. On the basis of this, the computer 4 modifies the robot motion program stored at the step 401 (step 404). The computer 4 sends the motion program thus modified to the robot controller and downloads it (step 405). The computer 4 makes the robot controller execute the modified motion program (step 406).

What is claimed:

1. A robot simulation apparatus in which an information processing apparatus is connected to a system formed by combining an actual robot with an actual peripheral device and simulation is conducted on a motion of said system, wherein said information processing apparatus and a robot controller for controlling a robot mechanical unit are connected to each other via a communication line;

robot mechanical unit motion position information outputted from said robot controller and command information to be outputted to said peripheral device are transmitted to said information processing apparatus via said communication line; and motions of said robot mechanical unit and motion of said peripheral device are displayed on a screen of said information processing apparatus in animation form, based on the robot mechanical unit motion position information and the command information.

2. The robot simulation apparatus according to claim 1, wherein:

the robot simulation apparatus includes a plurality of robot controllers, robot identification information is provided for each of the robot controllers, the robot identification information is added to each item of information sent from each of the robot controllers to said information processing apparatus, and an animation image is displayed on the screen of said information processing apparatus, based on the robot identification information.

3. The robot simulation apparatus according to claim 2, wherein a plurality of robot mechanical unit animation images respectively corresponding to the plurality of robots, are displayed on the screen of said information processing apparatus by using the robot identification information.

4. The robot simulation apparatus according to claim 1, wherein:

the robot mechanical unit motion position information, and the command information or the state information is stored respectively as history information of the motion of said robot and the motion of said peripheral device, and display is conducted based on the history information.

5. A robot controller used in the robot simulation apparatus according to claim 1.

6. A robot simulation apparatus in which an information processing apparatus is connected to a system formed by combining an actual robot with an actual peripheral device and simulation is conducted on a motion of said system, wherein said information processing apparatus and a robot controller for controlling a robot mechanical unit, are connected to each other via a communication line;

robot mechanical unit motion position information outputted from said robot controller and command information to be outputted to said peripheral device are transmitted to said information processing apparatus via said communication line during time intervals in which said robot control mechanical unit and said peripheral device are controlled; and motions of said robot mechanical unit and motion of said peripheral device are displayed on a screen of said information processing apparatus in animation form, based on the robot mechanical unit motion position information and the command information.

7. A robot simulation apparatus in which an information processing apparatus is connected to a system formed by combining an actual robot with an actual peripheral device and simulation is conducted on a motion of said system, wherein said information processing apparatus and a robot controller for controlling a robot mechanical unit, are connected to each other via a first communication line, and said robot controller and said peripheral device are connected to each other via a second communication line;

said robot controller sends robot mechanical unit motion position information to said information processing apparatus at predetermined time intervals, together with state information indicating a control state of said peripheral device received from said peripheral device; and an animation image of said robot mechanical unit and the state information indicating the control state of said peripheral device, are displayed on a screen of said information processing apparatus, based on the robot mechanical unit motion position information and the state information.

8. A robot simulation apparatus for conducting simulation on a motion of a system formed by combining an actual robot with an actual peripheral device, in which said information processing apparatus and a robot controller for controlling a robot mechanical unit are connected to each other via a first communication line, and said robot controller and said peripheral device are connected to each other via a second communication line;

said robot controller sends robot mechanical unit motion position information to said information processing apparatus at predetermined time intervals, together with state information indicating a control state of said peripheral device received from said peripheral device; and motions of said robot mechanical unit and motion of said peripheral device are displayed on a screen of said information processing apparatus in animation form, based on the robot mechanical unit motion position information and the state information.

9. A robot simulation apparatus, comprising:

a first information processing apparatus storing information concerning control of a robot or a peripheral device; and a second information processing apparatus connected to said first information processing apparatus via a communication line wherein;

the information concerning control of said robot or said peripheral device is sent from said first information processing apparatus to said second information processing apparatus via said communication line; and the information concerning control of said robot or said peripheral device is displayed on a screen of said second information processing apparatus.

10. the robot simulation apparatus according to claim 9, wherein said second information processing apparatus is a PLC (programmable logic controller).

11. The robot simulation apparatus according to claim 9, wherein the information concerning control of said robot or said peripheral device is control history of said robot or said peripheral device.

12. A robot simulation apparatus, comprising:

a first information processing apparatus information concerning control of a robot or a peripheral device and;

a second information processing apparatus connected to said first information processing apparatus via a communication line wherein:

the information concerning control of said robot or said peripheral device is sent from said first information processing apparatus to said second information processing apparatus via said communication line during time intervals in which said robot and said peripheral device are controlled; and the information concerning control of said robot or said peripheral device is displayed on a screen of said second information processing apparatus.

13. A robot simulation apparatus, comprising:

a first information processing apparatus storing information concerning control of a robot or a peripheral device; and a second information processing apparatus connected to said first information processing apparatus via a communication line, wherein:

the information concerning control of said robot or said peripheral device is sent from said first information processing apparatus to said second information processing apparatus via said communication line at predetermined time intervals; and said robot or said peripheral device is displayed on a screen of said second information processing apparatus in an animation form, based on the information concerning control of said robot or said peripheral device.

14. A robot simulation apparatus, comprising:

a robot having a robot controller controlling a robot mechanical unit, said robot controller outputting robot mechanical unit motion position information;

a peripheral device;

an information processing apparatus coupled to said robot controller via a communication line;

the robot mechanical unit motion position information from said robot controller and command information to be output to said peripheral device are transmitted to said information processing apparatus via said communication line; and a display displaying motion of said robot mechanical unit and motion of said peripheral device in animation form based on the robot mechanical unit motion position information and the command information.

* * * * *

UNITED STATES PATENT AND TRADEMARK OFFICE
CERTIFICATE OF CORRECTION

PATENT NO. : 6,928,337 B2  
APPLICATION NO. : 10/269992  
DATED : August 9, 2005  
INVENTOR(S) : Atsushi Watanabe et al.

It is certified that error appears in the above-identified patent and that said Letters Patent is hereby corrected as shown below:

On Title Page, item (75) Inventors, column 1, line 2, change "Minamitsura-gun" to --Minamitsuru-gun--

On Title Page, item (56) References Cited, Other Publications:

Column 2, line 1, change "intellignet" to --intelligent--

Column 2, line 3, change "intellignet" to --intelligent--

Column 2, line 12, after "Internet" insert --pp.--

Column 2, line 13, change "teh" to --the--

Column 2, line 16, delete "U.S." before "Application"

Column 8, line 6, change "motions" to --motion--

Column 8, line 53, change "motions" to --motion--

Column 9, line 31, change "motions" to --motion--

Column 9, line 50, change "the" to --The--

Column 10, line 4, after "apparatus" insert --storing--

Signed and Sealed this

Twenty-ninth Day of August, 2006

JON W. DUDAS  
*Director of the United States Patent and Trademark Office*